(12) United States Patent
Esmaeili et al.

(10) Patent No.: US 6,442,317 B1
(45) Date of Patent: Aug. 27, 2002

(54) HOLDING RIBBONIZED OPTICAL FIBERS

(75) Inventors: Sasan Esmaeili, Solna; Bertil Lohman, Sollentuna, both of (SE)

(73) Assignee: Telefonaktiebolaget LM Ericsson, Stockholm (SE)

( * ) Notice: Subject to any disclaimer, the term of this patent is extended or adjusted under 35 U.S.C. 154(b) by 0 days.

(21) Appl. No.: 09/523,289

(22) Filed: Mar. 10, 2000

(30) Foreign Application Priority Data

Mar. 12, 1999 (SE) .............................................. 9900902

(51) Int. Cl.⁷ .................................................. G02B 6/44
(52) U.S. Cl. ......................................... 385/114; 65/408
(58) Field of Search ................................ 385/100, 114, 385/115; 65/406, 408, 409–412

(56) References Cited

U.S. PATENT DOCUMENTS

| | | | |
|---|---|---|---|
| 3,937,559 A | * 2/1976 | Ferrentino et al. | 385/114 |
| 3,984,172 A | * 10/1976 | Miller | 385/114 |
| 4,090,902 A | * 5/1978 | Ferrentino et al. | 385/114 |
| 4,190,319 A | * 2/1980 | Eggleston | 385/114 |
| 4,861,135 A | * 8/1989 | Rohner et al. | 385/114 |
| 4,980,007 A | * 12/1990 | Ferguson | 385/114 |
| 5,076,881 A | * 12/1991 | Ferguson | 385/114 |
| 5,333,233 A | * 7/1994 | Mansfield et al. | 385/114 |
| 5,611,017 A | * 3/1997 | Lee et al. | 385/114 |
| 5,902,435 A | * 5/1999 | Meis et al. | 156/230 |

FOREIGN PATENT DOCUMENTS

GB    3 187 865 A    9/1987

* cited by examiner

*Primary Examiner*—Akm E. Ullah
*Assistant Examiner*—Michelle R. Connelly-Cushwa
(74) *Attorney, Agent, or Firm*—Nixon & Vanderhye, P.C.

(57) ABSTRACT

Optical fibers which are disposed in parallel and at each other in a plane, are fixed in this position by pieces of tapes provided with an adhesive on their surfaces facing the fibers, so that the tape pieces are located exactly opposite each other on the two large surfaces of the parallel fiber assembly. The tape pieces can extend exactly up to the lateral edges of the assembly but can advantageously be a little longer, so that adhesives from the opposite tape pieces come in contact with each other at the lateral edges of the assembly. The tape pieces are advantageously cut off from specially designed retainer tapes having openings which are provided in pairs with the openings of each pair placed opposite each other at each of the edges, of the tapes. The assembly is placed so that it extends over the two openings of a pair of openings, crossing or perpendicular to the longitudinal direction of the tapes. Then a cutting-off or more particularly two cuts are made in the tape, using knives, only between the openings of the pair, from one opening to the other one. Then a piece of the tape between the openings is separated which adheres to the assembly and keeps it together. Between the knives a cushion of an elastic material is provided which in a cutting-off movement presses the tapes in a direction towards a counterplate.

15 Claims, 3 Drawing Sheets

HOLDING RIBBONIZED OPTICAL FIBERS

The present invention relates to a method of holding, or keeping a multitude of individual optical fibers together which are located parallel to and at each other forming a flat structure, so called ribbonized optical fibers, to form a united ribbon structure, further to an adhesive tape to form such a united ribbon structure and to a device for placing the adhesive tape to keep a multitude of optical fibers together.

BACKGROUND

In the fiberoptical communication technical field, to a wider and wider extent, in addition to loose optical fibers, optical ribbon fibers or "ribbons" are used, i.e. optical fibers which by an exterior means such as a polymer sleeve are kept together to form a unit of type ribbon cable, i.e. a flat fiber package consisting of a number of parallel optical fibers. Typical numbers can be 4, 6, 82 or 12 fibers in a ribbon fiber. When splicing optical fibers and ribbon fibers often welding is used. A splice can in principle be made between individual optical fibers, between ribbon fibers and between ribbon fibers and individual optical fibers. The latter operation can be a complex, labour consuming and time demanding procedure including much manual handling which naturally is costly. Devices for facilitating the handling of loose fibers in such splicing operations have been proposed, see for example the published European patent application 95850079.5 and the corresponding U.S. Pat. No. 5,586,211. In such devices the loose optical fibers can be placed in a narrow slot pressed to each other, so that they are placed in the same way as the individual optical fibers in a ribbon fiber. The fibers can in this state be clamped by a detachable fiber retainer or fiber holder which together with the fibers can be moved to a welding device. Splicing such fibers composed to an assembly can be made in a relatively simple way and relatively fast in welding devices intended for splicing ribbon fibers compared to splicing only one fiber at a time. However, the fiber retainer is a relatively unwieldy metal part which is not suitable for all handling.

In the published British patent application 2 187 865 an optical ribbon cable is disclosed which has a number of parallel optical fibers located at each other, the optical fibers being joined by e.g. strips of a plastics material.

SUMMARY

It is an object of the invention to provide methods and means for more or less permanently keeping loose optical fibers tog ether which are arranged in a parallel structure to form a unit similar to a ribbon fiber.

It is a further object of the invention to provide means for comfortably handling loose optical fibers which are arranged in a parallel structure, such as for moving the optical fibers to various processing stations.

The problem which the invention tries to solve is thus how to join loose optical fibers to form a unified flat structure similar to a ribbon cable or ribbon fiber which can be easily handled for for example splicing.

Optical fibers located parallel to each other in a plane are fixed in this position by tape pieces or strips of tape provided with an adhesive on their surfaces facing the fibers so that the tape pieces are located exactly opposite each other on both sides of the parallel fiber assembly. The tape pieces can extend exactly up to the longitudinal or outer, lateral sides or edges of the assembly but can advantageously be somewhat longer so that adhesives from the opposite tape pieces come in contact with each other at the longitudinal edges of the assembly. The tape pieces are advantageously cut from specially designed retainer or holder tapes which have openings arranged in pairs, the openings of each pair being placed opposite each other at each of the longitudinal or lateral edges of the tape. The assembly is placed so that it extends over the two openings of a pair of each tape, transversely or perpendicularly to the longitudinal direction of the tape. Then the tapes are cut off or more particularly two cuts are made in the tapes only between the openings of the pairs, from one opening of a pair to the other opening of the same pair. Then a piece of each tape located between the openings is separated and adheres to the assembly joining the fibers to form a unit which can be easily and comfortably handled.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which:

DETAILED DESCRIPTION

Figure 1:
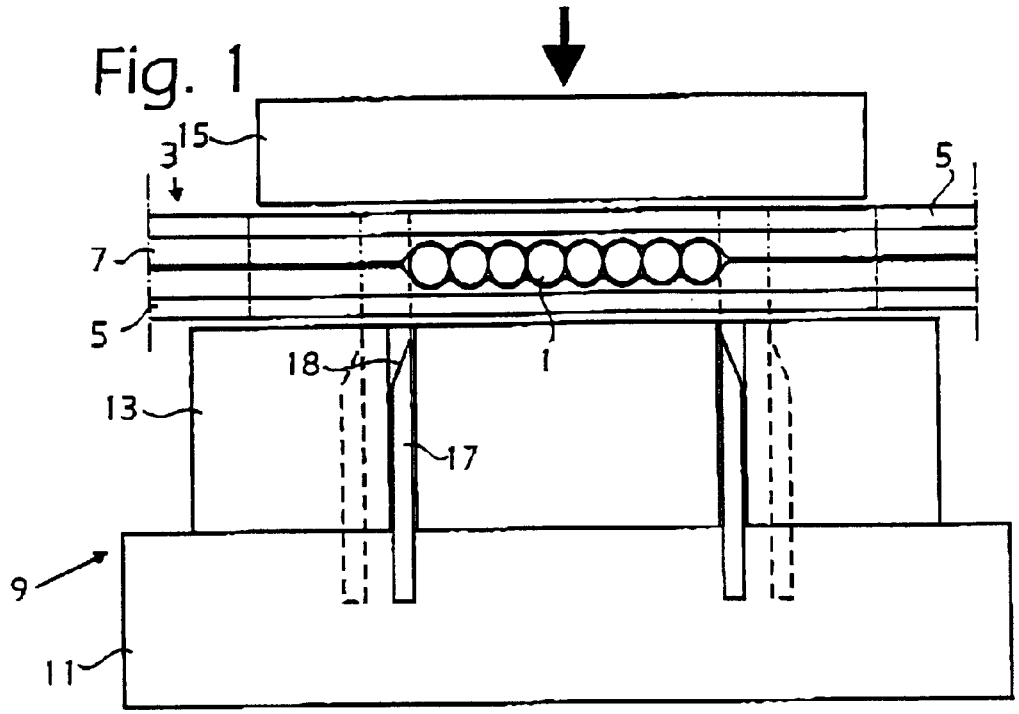
FIG. 1 is an elevational view schematically showing tapes which carry a pressure sensitive adhesive and are placed for holding loose, parallel optical fibers to form a single unit.
Figure 4:
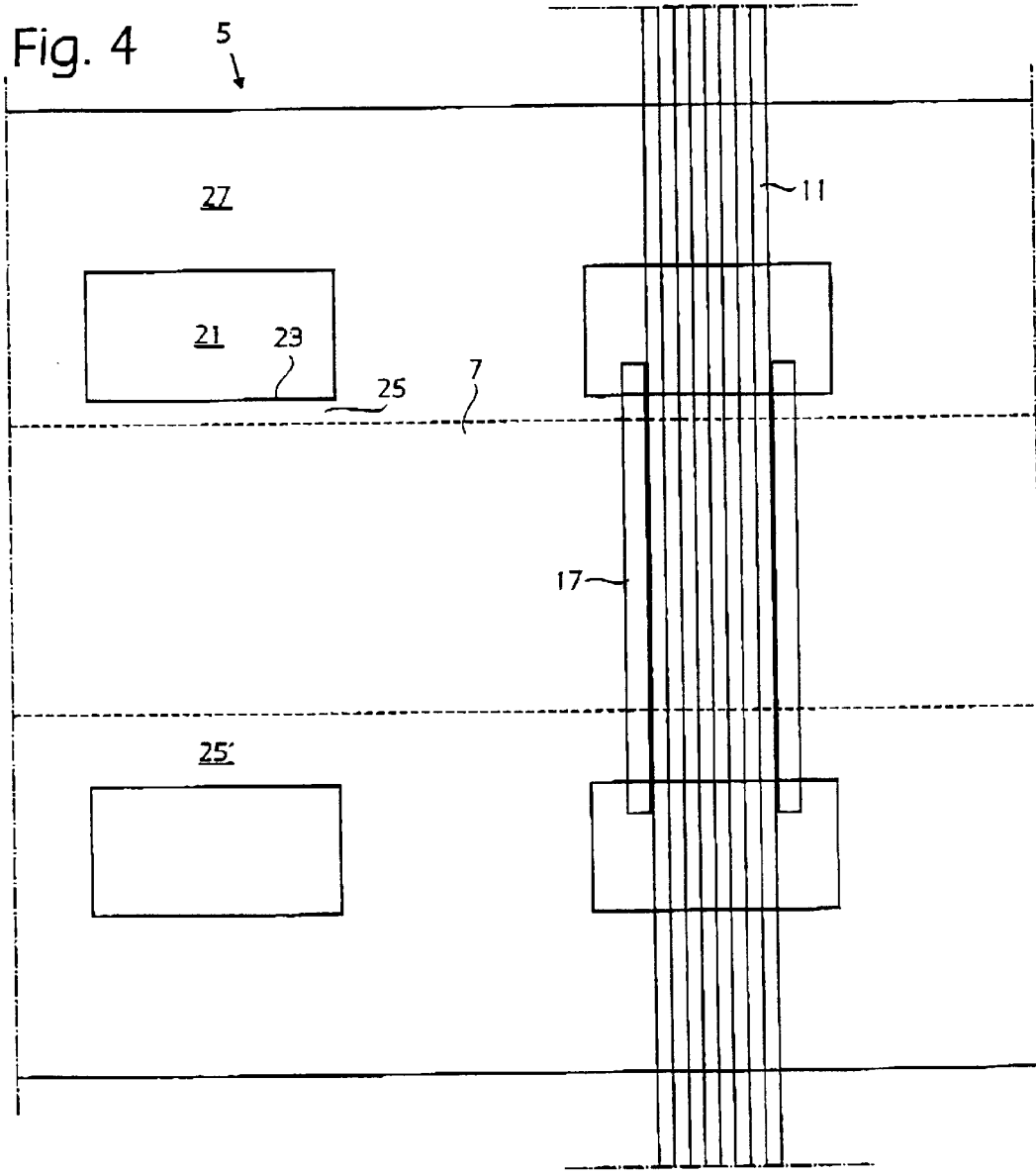
FIG. 4 is a view from above schematically showing the tapes and the optical fibers according to FIG. 1 before a cutting-off operation.

In FIGS. 1 and 4 an assembly of eight optical fibers 1 are shown which are placed at each other in the same plane, for example obtained in this shape by using a fiber organizer according to the cited European patent application 95850079.5. Perpendicularly to the longitudinal direction of the fibers, on the top side and on the under side of the flat fiber assembly tapes 3 are located which include a carrier 5 of a suitable artificial resin material such as a polyester and a strip-shaped layer or strip or string 7 of a pressure-sensitive adhesive arranged at the center of the carrier tape 5, in the longitudinal direction thereof. The free surface of the adhesive layer 7 is pressed against the fiber assembly and adheres thereto.

The tapes are pressed against the fiber assembly between a lower die, 9 consisting of a fixedly arranged, rigid lower plate 11 and an elastic rectangular body 13 placed thereon, and a movable, upper rigid pressing plate 15. From the lower plate 11 two flat knife blades 17 extend through slits 18 in the elastic cushion 13. When the upper plate 15 is pressed against the upper tape having a pressure-sensitive adhesive, it sticks to the fiber assembly and also the lower tape sticks to the fiber assembly. The adhesive partly penetrates between and encloses the individual fibers. In the continued movement downwards of the upper plate 17 the elastic cushion 13 is compressed, the edges of the knives 17 protrude out of the cushion and into firstly the lower tape and thereupon the upper tape 3 until the edges nearly come in contact with the lower surface of the upper plate 15. Thereby, pieces of the tapes 3 are separated which keep the fiber assembly together to form a unit which can be easily handled.

Figure 2:
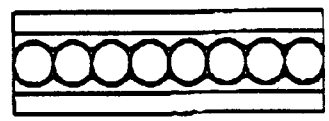
FIG. 2 is an elevational view of parallel optical fibers according to FIG. 1 having cut-off tape pieces keeping the fibers together.
Figure 3:
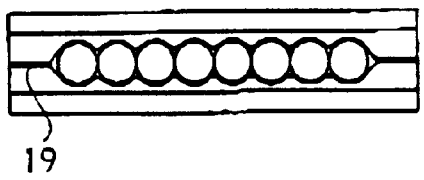
FIG. 3 is an elevational view similar to FIG. 3 but showing longer tape pieces.

The knife blades 11 can either separate tape pieces which have end surfaces aligned with the exterior sides of the fiber assembly as is illustrated in FIG. 2. Alternatively the knife blades can have a location as shown in dashed lines in FIG. 1. Then edges of the cut-off tape pieces are located at a small distance of the same exterior sides of the fiber assembly so that portions of the adhesive layers on the cut-off upper and lower tape pieces adhere to each other at the sides of the fiber assembly as shown at 19 in FIG. 3. It can result in a firmer and more secure holding of the fiber assembly.

The tapes 3 have a design which particularly is visible in FIG. 4. The adhesive is, as has already been mentioned, disposed as strings or strips 7 at the middle of the carriers 5 of the rapes, only on one surface thereof. In the carrier 5 of each tape openings or through-holes 21 are provided which are symmetrically placed around the longitudinal center axis of the tape. The openings are located outside the adhesive center string and have inner straight edges 23 facing the center line of the tape. These inner edges are located at a small distance of and parallel to the sides of the middle string 7 so that a narrow area 25 having no adhesive is provided between the middle string and the openings 21. The string 7 can as is illustrated in the figure be located somewhat displaced from an exactly central position on the carrier 5 so that on one side a somewhat broader area 25' having no adhesive between the adhesive string and the openings 21 on this side is obtained. The openings 21 can as illustrated have a rectangular shape having large sides including the inner edges located parallel to the edges of the tapes 3 and be located periodically repeated in the longitudinal direction of the tapes. They are naturally advantageously used for feeding the tapes using suitable toothed wheels, not shown.

Each tape 3 is placed on the assembly of optical fibers 1 so that the assembly passes over opposite openings 21, advantageously symmetrically over these openings, centrally thereover. The edges of the knife blades 17 have a length exceeding the distance between the opposite openings and act against the central portion of the tapes 3. Thereby, in the downward movement of the upper plate 15 portions of the tapes 3, which are located between opposite openings, are cut off. Each tape 3 is after the cutting operation still one unit owing to the fact that the tape portions 27 outside the openings 21 are not cut through by the knife blades 17. Thus, the openings 21 have a length in the longitudinal direction of the tapes 3 exceeding the width of the fiber assembly. In the alternative location of the knife blades, compare FIG. 3, the openings 11 must have a greater length in the longitudinal direction of the tapes, since this length must always be larger than the distance between the knife blades 17. A cut-off tape piece will at each of its non-cut-off edges have a narrow area which does not adhere to the fibers of the assembly and which is a part of the portions 25, 25'. These narrow areas and in particular the broader one thereof facilitates the removal of the cut-off tape pieces from the fiber assembly in the case where it would be required, since a tape piece then can be gripped, at the non-adhering margin, using a pair of forceps or a, similar device.

Figure 5:
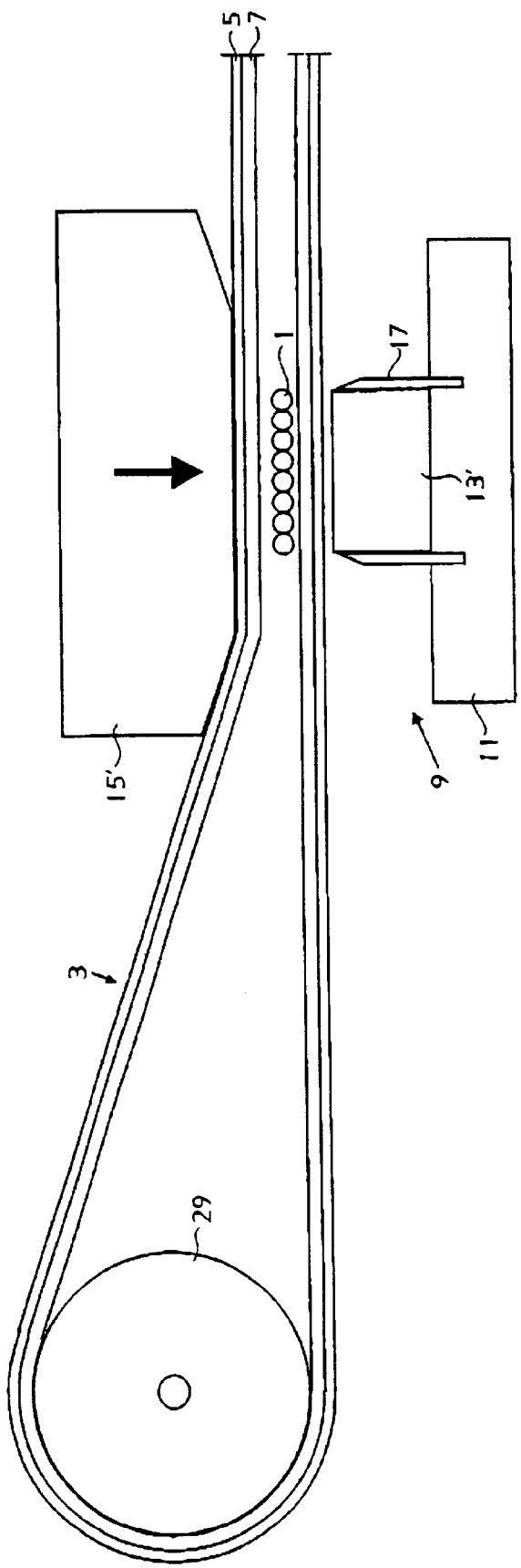
FIG. 5 is a schematic elevational view showing a device for pressing and cutting-off the tapes when they are arranged on top of and below an assembly of parallel optical fibers.

In FIG. 5 the placement of, the adhesive tape pieces is schematically illustrated. An adhesive tape 3 passes with an upper path between the presser, ram or upper plate 15' and the optical fibers 1 arranged in a parallel structure, therefrom around a wheel 29 and from the wheel, in a lower path, back under the optical fibers, between them and the die 9. The wheel 29 can be designed so that it only comes in contact with the outer portions of the surface of the tape 3 where no adhesive is provided. The upper plate 15' can have a lower completely flat portion for engagement with the upper path of the tape 3, which flat portion in a rounded fashion continues to portions which are located at the sides and are arranged in some small angle to the lower portion. The die 9 is here shown to have the elastic body 13' placed only between the knives 17 to exert a pressing force from beneath against the lower path of the tape 3. When placing the adhesive tape pieces firstly the tape 3 is fed so far, that a pair of openings 21 in the upper path of the tape is located opposite a pair of such openings in the lower path of the tape and so that the openings are located centrally in relation-to the knives 17. In order to make it possible it may be necessary to displace the wheel 29 somewhat laterally, i.e. in the plane of the paper in FIG., 5. The optical fibers 1 are then placed between the upper plate 15' and the die 9, so that they, seen vertically, are located, opposite said openings, centrally in front of the openings, perpendicularly to or crossing the tape 3. Then the cutting-off is made by moving the upper plate 15 downwards in the direction of the arrow. The upper plate 15' is then again moved upwards and the ends of the tape 3 located at the right side in the figure are pulled away from each other, i.e. upwards and downwards respectively, so that possible parts of the upper and lower paths of the tapes which have adhered to each other in the pressing and cutting-off movement, are released from each other. Thereafter the optical fibers now well joined to form a single unit are removed from the device.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claim are intended to cover all such modifications and changes as fall within a true spirit and scope of the invention.

What is claimed is:

1. A method of forming from loose optical fibers a joined structure similar to a ribbon cable, the method comprising the steps of:

placing loose optical fibers at each other in a plane to form a flat assembly having two large surfaces opposite each other, thereafter placing, on the two large surfaces of the flat assembly, tapes having an adhesive making the adhesive come in contact with surfaces of the optical fibers in the flat assembly, so that a longitudinal direction of the tapes is substantially perpendicular to a longitudinal direction of the optical fibers and so that a first one of the tapes is located on a first one of the two large surfaces and opposite a second one of the tapes located on the opposite, second one of the two large surfaces, and finally cutting off the tapes at outer lateral edges of the flat assembly, taken in the plane of the assembly, so that opposite pieces of the tapes remain and adhere to the large surfaces of the flat assembly and to surfaces of the optical fibers in the flat assembly, thereby joining the optical fibers.

2. The method of claim 1, wherein, in the step of cutting off the tapes, the cutting-off is made exactly at the outer lateral edges of the flat assembly and exactly at outer sides, taken in the plane of the flat assembly, of outermost optical fibers in the flat assembly.

3. The method of claim 1, wherein, in the step of cutting of the tapes, the cutting-of is made at a distance of and outside the outer lateral edges of the flat assembly and at outer sides, taken in the plane of the assembly, of outermost optical fibers in the flat assembly, whereby adhesives of the cut-off opposite pieces which adhere to the optical fibers of the flat assembly adhere to each other at and outside the outer lateral edges of the flat assembly.

4. The method of claim 1, wherein, in the step of cutting the tapes, the cutting-off is made by pressing the flat assembly including the tapes placed on the flat assembly against edges of knives or inversely, and providing between the knives a body of an elastic material which in the pressing is pressed against a surface of one of the tapes and thereby is compressed to firmly hold the flat assembly.

5. The method of 4, wherein, in the step of cutting the tapes, a die is pressed against one side of the flat assembly having the tapes placed on the flat assembly in a direction towards the edges of the knives.

6. The method of claim 1, wherein, in the step of cutting, the tapes, the cutting-off is made by pressing the flat assembly including the tapes placed on the flat assembly against edges of knives or inversely, the edges of the knives being placed in slits in a body of an elastic material so that the body in the pressing is pressed against a surface of one of the tapes and thereby is compressed to firmly hold the flat assembly.

7. The method of claim 1, wherein, in the step of placing the tapes, the tapes are given openings, the openings of each tape being arranged in pairs with a first opening of a pair located at a first edge of the tape and a second opening of the pair at a second, opposite edge of the tape, the placing being made so that for each tape the flat assembly extends over the openings of a pair of the tape.

8. The method of claim 7, wherein, in the step of cutting the tapes, the cutting-off is made only between the two openings of pairs.

9. A device for forming a joined structure similar to a ribbon cable from loose optical fibers placed at each other in a plane forming a flat assembly having two large surfaces, the device comprising:

means for placing, on the two large surfaces of the flat assembly, tapes having an adhesive to make the adhesive of tape come in contact with surfaces of the optical fibers in the flat assembly with a longitudinal direction of the tapes substantially perpendicular to a longitudinal direction of the optical fibers in the flat assembly so that a first one of the tapes is located on a first one of the large surfaces and opposite a second one of the tapes which is located on a second, opposite one of the large surfaces, means for pressing the first and second ones of the tapes against the large surfaces of the assembly, and means for cutting off, the tapes at outer lateral edges of the flat assembly, taken in the plane of the flat assembly, so that opposite, cut-off pieces of the tapes adhere to the large surfaces of the flat assembly and to surfaces of the optical fibers of the flat assembly.

10. The device of claim 9, wherein the cutting-off means comprise knives located to make the cutting-off exactly at the outer lateral edges of the flat assembly and at lateral, outer sides, taken in the plane of the flat assembly, of outermost optical fibers in the flat assembly.

11. The device of claim 9, wherein the cutting-off means comprise knives which are located to make the cutting-off at a distance of and outside the outer lateral edges of the flat assembly and at lateral, outer sides, taken in the plane of the flat assembly, of outermost optical fibers in the flat assembly, whereby adhesives of the cut-off pieces of the tapes which adhere to the optical fibers adhere to each other at and outside the lateral edges of the flat assembly.

12. The device of claim 9, wherein the cutting-off means comprise a die including knives and a counterplate, the die and counterplate arranged to move, in the cutting-off operation, towards each other, and a body of elastic material provided between the knives, which body in the movement to make the cutting-off is pressed against a surface of one of the tapes and thereby is compressed to firmly hold the flat assembly.

13. The device of claim 9, wherein the cutting-off means comprise a die including knives and a counterplate, the die and counterplate arranged to move, in the cutting-off operation, towards each other, and a body of elastic material having slits in which the knives are placed so that the body of elastic material, in the pressing movement, is pressed against a surface of one of the tapes and thereby is compressed to firmly hold the flat assembly.

14. The device of claim 9, wherein the means for placing the tapes are arranged to place tapes having openings, the openings being located in pairs with a first opening of a pair at a first edge of the tape and a second opening of the pair at a second, opposite edge of the tape, and to make the placing so that the flat assembly extends over the openings of a pair of the first one of the tapes and over the openings of a pair of the second one of the tapes.

15. The device of claim 14, wherein, the cutting-off means have knives which make cuts only between said openings of the pair of the first one of the tapes and only between said openings of the pair of the second one of the tapes.

* * * * *